United States Patent [19]

Cruz

[11] 4,243,877
[45] Jan. 6, 1981

[54] ELECTRO-OPTICAL TARGET FOR AN OPTICAL ALIGNMENT SYSTEM

[75] Inventor: Jose C. Cruz, Columbus, Ind.

[73] Assignee: Cummins Engine Company, Inc., Columbus, Ind.

[21] Appl. No.: 17,434

[22] Filed: Mar. 5, 1979

[51] Int. Cl.³ .............................................. G01J 1/20
[52] U.S. Cl. .................................. 250/201; 356/152
[58] Field of Search .............. 290/201, 202, 203, 204, 290/221; 356/141, 152, 399, 400

[56] References Cited

U.S. PATENT DOCUMENTS

| | | | |
|---|---|---|---|
| 3,323,408 | 6/1967 | Bishop et al. | |
| 3,470,377 | 9/1969 | Le Febre et al. | |
| 3,522,859 | 8/1970 | Thring | |
| 3,603,691 | 9/1971 | Hamilton | 250/201 |
| 3,790,276 | 2/1974 | Cook et al. | |
| 4,105,339 | 8/1978 | Wirtanen | 356/152 |

*Primary Examiner*—David C. Nelms
*Attorney, Agent, or Firm*—Sixbey, Friedman & Leedom

[57] ABSTRACT

An optical alignment system for optically determining the translational and rotational orientation of portions of an object with respect to a system reference utilizing a reflective target (8) positioned on the object portion and adapted to receive an optical reference beam (6) transmitted to the target (8) from the reference position. The reflective target (8) includes a photoelectric sensor (22) for producing an electrical signal indicative of the lateral displacement of the reflective target (8) from the optical reference beam (6) and a reflective surface (mirror 24) for returning a portion (return beam 26) of the optical reference beam (6) to a photosensor (28) positioned adjacent the reference beam source (12) to provide information relative to the angular position of the reflective target (8). A method for operating the system is also disclosed.

12 Claims, 6 Drawing Figures

ELECTRO-OPTICAL TARGET FOR AN OPTICAL ALIGNMENT SYSTEM

TECHNICAL FIELD

This invention relates to an electro-optical testing apparatus for determining the translational and rotational orientation of an object or portions of an object. In particular, the disclosed apparatus is designed to determine the alignment of machined portions of an article of manufacture such as the crankshaft and/or camshaft supports within an engine block.

BACKGROUND ART

With the development of laser technology, highly accurate optical alignment systems have become a practical reality. As good as these systems are, the various components making up such systems are still subject to vibration, shock, metal creep, and temperature expansion and contractions, all of which leads to inaccuracies in measurements performed by the apparatus. A variety of techniques have been proposed employing complex optical systems to avoid the inaccuracies introduced by the optical components of the system. For example, U.S. Pat. No. 3,522,859 discloses apparatus for measuring the relative positions of a pair of surfaces wherein a specialized optical element is employed to obviate the effects of minor inaccuracies or changes in the position of the support structure for the optical elements of the measuring apparatus. While useful for the purposes disclosed, devices of this type are expensive to manufacture and are not suited for some types of applications where it is desired to determine lateral as well as rotational position or alignment information.

U.S. Pat. No. 3,323,408 discloses an optical alignment system including a light source mounted behind a collimator for projecting a light beam from a reference position toward a reflective target adapted to be mounted on an object the position of which it is desired to measure. The disclosed target may include a first reflective element for imparting lateral displacement information to a return beam and a second reflective element for imparting angular displacement information to a second return beam. The return beams may be intercepted and directed to a photosensitive element by a beam splitter placed within the projected beam formed by the light source and collimator. In devices of this type, the accuracy of the lateral displacement information contained in the return beam formed by the first optical element is a function of the precision of the first optical element. As the distance between the reflective target and the reference position increases, any imperfections in the optical element which result in divergence of the return beam are amplified. Should the distance between the reflective target and the reference position be subject to variation, it becomes extremely difficult to correct errors in measurement without recalibration. Such distance variations are a particular problem when the alignment of machined surfaces in articles of manufacture are optically tested as the articles are moved on a conveyor past an optical testing station.

U.S. Pat. No. 3,790,276 discloses that it is known to sense displacements by projecting an optical beam from a reference location toward a remotely positioned photoelectric sensor. Devices of this type, however, require a photocell array and extremely complex digital electronic processing circuitry in order to produce both angular and lateral displacement information. Somewhat more simplified circuitry is illustrated in U.S. Pat. No. 3,470,377 which discloses an optical position sensing device employing a photosensor array for detecting the pitch and yaw of a remote reflective element arranged to form a return beam projected onto the photosensor array.

In summary, the prior art has failed to disclose a relatively simple electro optical alignment testing apparatus which is both convenient and highly accurate.

DISCLOSURE OF THE INVENTION

It is a primary object of this invention to overcome the deficiencies of the prior art as discussed above. In particular, it is an object of this invention to provide apparatus for optically determining the translational and rotational orientation of portions of an object with respect to a system reference utilizing a reflective target positioned on the object portion and adapted to receive an optical beam transmitted to the target from the reference position.

It is a further object of this invention to provide a reflective target for an optical alignment system when the reflective target includes photoelectric means for producing an electrical signal indicative of the lateral displacement of the reflective target from an optical reference beam and a reflective surface for returning a portion of the optical reference beam to a photo sensor positioned adjacent the reference beam source to provide information relative to the angular position of the reflective target.

It is another object of this invention to provide a highly accurate yet simplified optical alignment testing apparatus including a single reflective target adapted to be positioned on machined surfaces of varying size and configurations thereby to permit great adaptability in application of the optical alignment testing apparatus.

A more specific object of the subject invention is to provide an optical alignment testing apparatus including a reflective target of the type described above for positioning within one of a plurality of adaptor sleeves wherein the sleeves are adapted to be placed within bores of approximately corresponding sizes, respectively, thereby to permit testing of the alignment of the central axis of each bore in which the reflective target is placed.

Still another object of the subject invention is to provide a method for measuring the rotational and translational alignment of a portion of an object relative to a remote reference position including the steps of (1) projecting a referenced beam along an optical axis extending from the reference position toward the object, (2) returning a first portion of the optical beam received by the object along a reflected beam axis which forms an angle with the axis of the projected beam and which is indicative of the rotational position of the portion of the object relative to a pair of perpendicular axes, (3) sensing the position of the remaining portion of the optical beam at the location of the portion of the object being tested, (4) forming a signal from the remaining portion indicative of the translational position of the object relative to the reference point, and (5) sensing the remaining portion of the optical beam returned from the object and producing an electrical signal indicative of the rotational position of the portion of the object being tested relative to the reference position.

Still other and more specific objects of this invention may be appreciated by consideration of the following Brief Description of the Drawings and the following description of the Best Mode for Carrying Out the Invention.

BEST MODE FOR CARRYING OUT THE INVENTION

Figure 1:
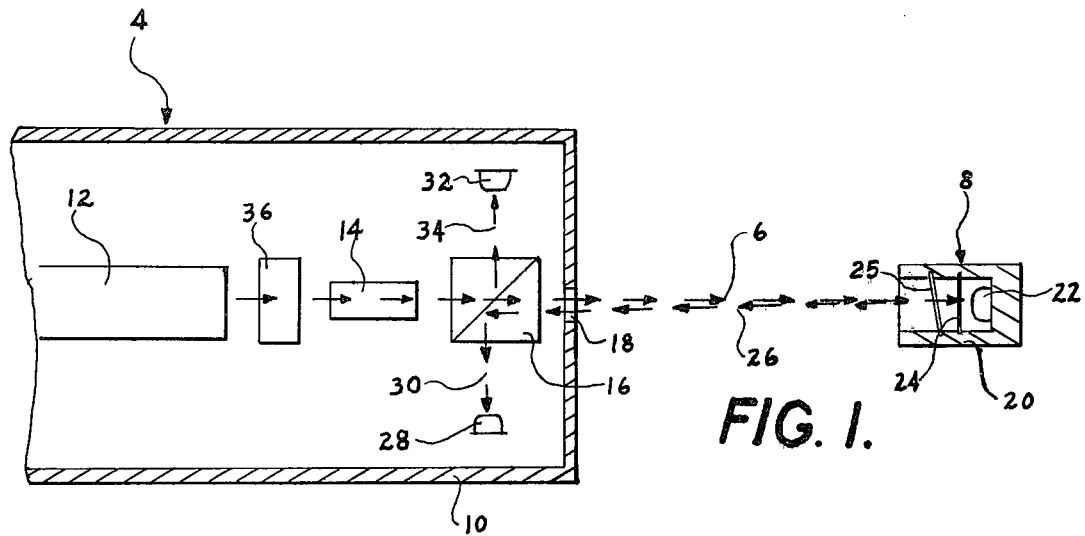
FIG. 1 is a partial cross-sectional view of an electro-optical alignment system designed in accordance with the subject invention.

Referring initially to FIG. 1, a partial cross-sectional view of an electro-optical alignment system designed in accordance with the subject invention is illustrated including an optical head assembly 4 for projecting an optical beam 6 toward a remote reflective target 8 adapted to be mounted on or in contact with portions of an object (not illustrated) the alignment of which is to be tested. Optical head assembly 4 includes a base means in the form of a housing 10 for defining a system reference when mounted on a stable support (not illustrated). Housing 10 may include structure for adjustably positioning the housing with respect to an underlying stable support or may be adapted for permanent mounting on a support when the apparatus is designed to be employed continuously at one location. As will be explained more fully hereinbelow, housing 10 may also include mounting structure permitting the housing to be supported within a machine tool such as the spindle head of a boring machine.

To form the optical beam 6, housing 10 includes a light source 12 which may be a laser or other type of light source having the characteristic of producing light of a wavelength detectable by commercially available photo detectors. The light produced by light source 12 is passed through a collimating lens assembly 14 to provide a relatively narrow highly collimated optical beam 6 which passes through a beam splitter 16 before emerging from housing 10 through an aperture 18.

As noted above, reflective target 8 is mounted in contact with a surface the alignment of which is to be tested. To accomplish this purpose, reflective target 8 includes a housing 20 containing a photo detector 22 arranged perpendicularly to reference axis of housing 20. Normally, housing 20 will be positioned and oriented such that the reference axis of the housing is nominally aligned with the axis of beam 6. A partially silvered mirror 24 is also mounted within housing 20 to intersect optical beam 6 for forming a return beam 26 out of a first portion of beam 6. Because partially silvered mirror 24 is arranged precisely perpendicularly to the reference axis of housing 20, the central axis of return beam 26 will form an angle with the central axis of projected beam 6 which, in magnitude and orientation, is indicative of the rotational position of the reference axis of housing 20 relative to the central axis of projected beam 6.

Partially silvered mirror 24 permits the remaining portion of projected beam 6 to pass through the mirror and impinge upon photo detector 22. As will be discussed more fully hereinbelow, photo detector 22 is of the type which is capable of determining the lateral or translational position of a light beam impinging thereon relative to a center point on the surface of the photo detector. Accordingly, detector 22 is capable of producing an electrical signal indicative of the translational position of the reflective target 8 relative to the reference position established by the optical head assembly 4 and the projected optical beam 6. At the same time the reflected target 8 operates to produce an optical signal in the form of return beam 26 which is indicative of the rotational position of the reflective target relative to the system reference defined by the optical head assembly 4. To eliminate unwanted reflections, a plane glass 25 may be mounted within housing 20 in front of mirror 24 at an acute angle with respect to a plane normal to the central axis of housing 20.

Beam splitter 16 is arranged to direct the return beam 26 unto a photo detector 28 along a path indicated by beam 30. To compensate for light source intensity variation and to assist in filtering out ambient light interference, a reference photo detector 32 may be employed to receive a reference beam 34 formed by beam splitter 16. Additional improvement in the signal to noise ratio can be achieved by employing an optical chopper 36 mounted to blank out optical beam 6 at a predetermined constant frequency as will be discussed more fully hereinbelow.

Figures 2A, 2B:
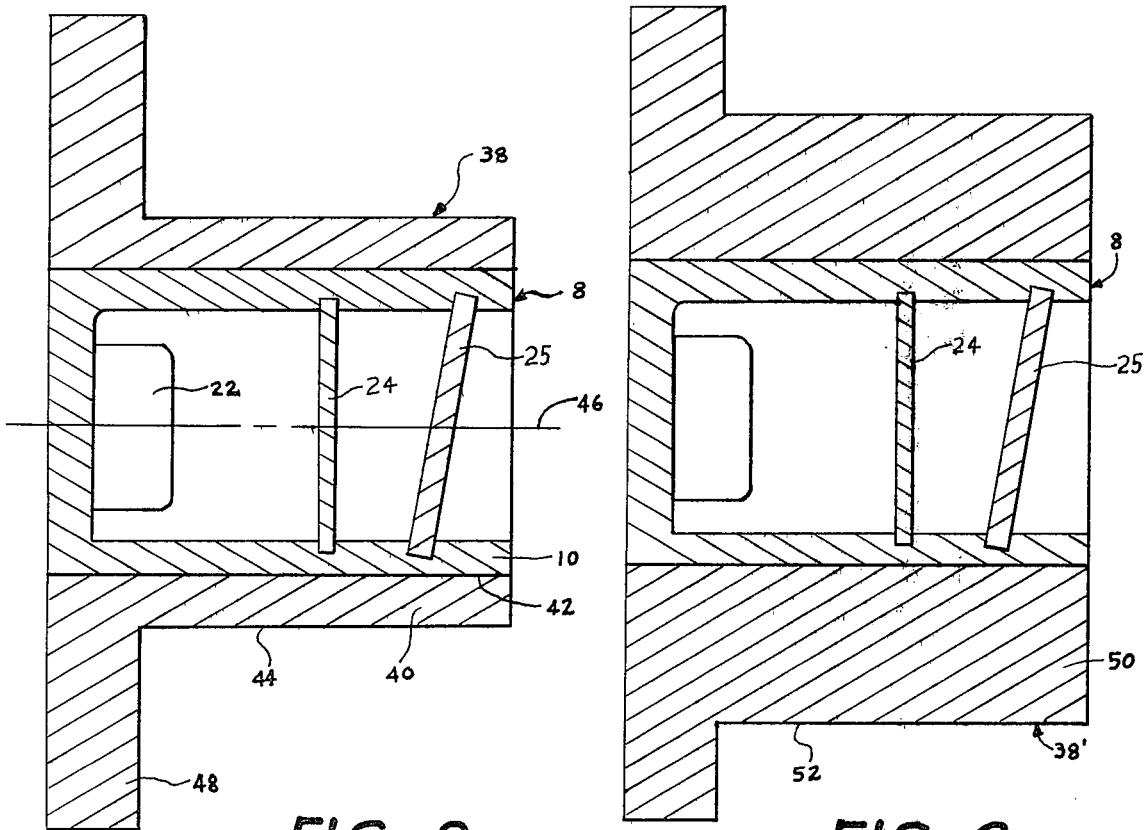
FIG. 2a is a cross-sectional view of a reflective target for use with an electro-optical alignment system as disclosed in FIG. 1 wherein the target is mounted within an adaptor for positioning the target within a bore hole.
FIG. 2b is a cross-sectional view of the reflective target of FIG. 2a mounted within an adaptor for positioning the target within a bore hole having an inside diameter larger than the bore hole in which the adaptor of FIG. 2a is designed to be placed.

Turning now to FIGS. 2a and 2b, reflective target 8 is illustrated in combination with adaptors for mounting the reflective target within machined bore holes of varying size. In particular, FIG. 2a illustrates an adaptor 38 including a sleeve 40 having an internal bore 42 which forms means for receiving and mounting the housing 10 of reflective target 8. The outside surface 44 of sleeve 40 is cylindrical in shape and is concentric about the central axis 46 of housing 10. Axis 46 passes through the center of photo detector 22. The diameter of surface 44 is of a magnitude to cause sleeve 40 to fit snuggly within a machined bore hole formed in an article of manufacture (not illustrated). Radial flange 48 forms a portion of adaptor 38 and is used to assist in positioning sleeve 40 within a bore the alignment of which is to be tested. Adaptor 38 functions to position the central axis 46 of the reflector target 8 coaxially with the central axis of the bore to be tested.

FIG. 2b is a cross-sectional view of an alternative embodiment of an adaptor 38' wherein the sleeve portion 50 of the adaptor has an outer cylindrical surface 52 of a much larger diameter for purposes of positioning the reflective target 8 within a machined bore hole of a complementary diameter. It should now be apparent that the reflective target 8 is adapted to be mounted within any sized bore hole through the use of an adaptor the inside of which is configured to receive the reflective target and the outside of which is configured to position the reflective target within a predetermined relationship relative to the portion of an object upon which or within which the adaptor is arranged to be supported.

Figure 3:
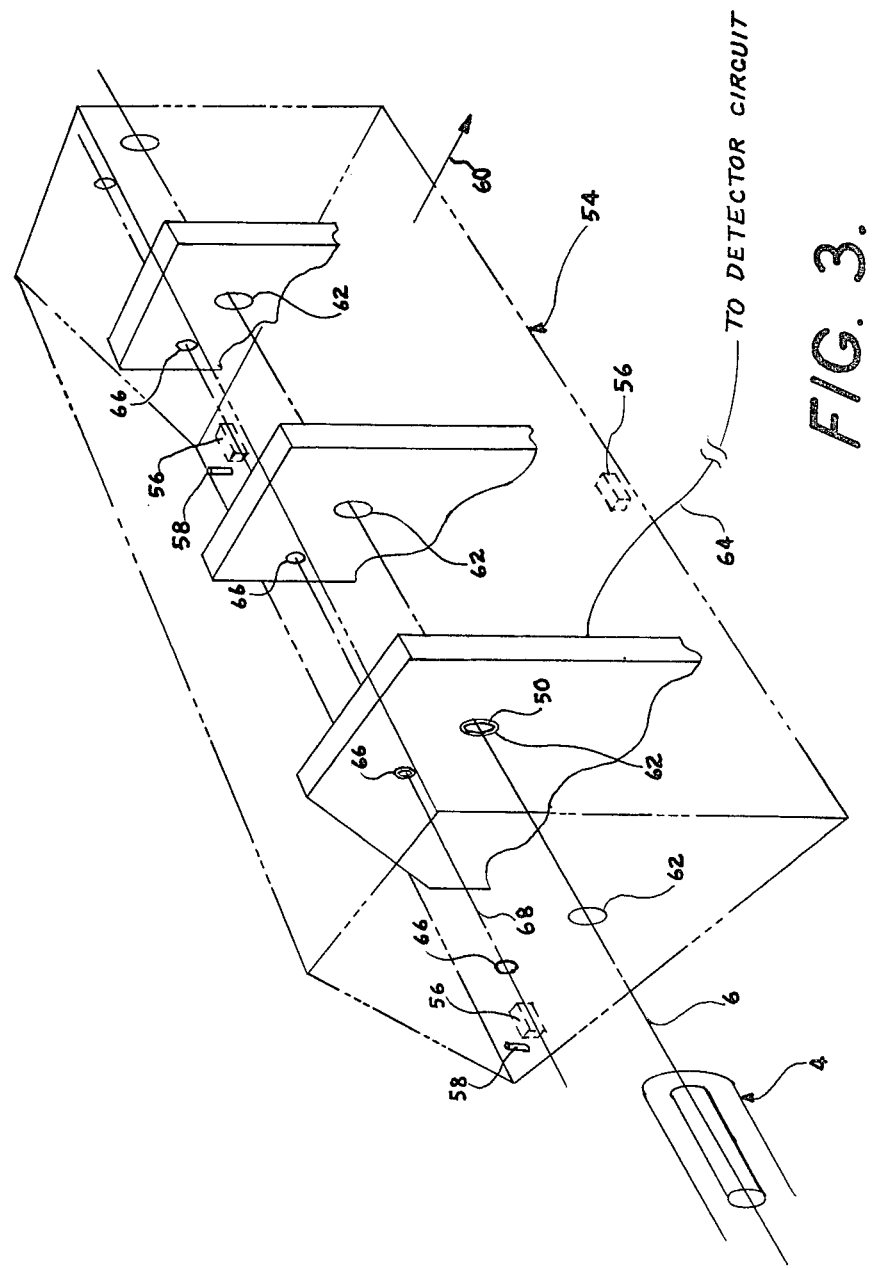
FIG. 3 is a schematic perspective view of one application for the electro-optical alignment system of FIG. 1 with which the alignment of bore holes formed in an engine block may be tested.

Turning now to FIG. 3, a more specific application of the alignment system illustrated in FIGS. 1 and 2 is illustrated wherein an engine block 54 is disclosed schematically by dashed lines. An optical head assembly 4 is positioned in a fixed relationship with respect to three positioning stops 56 arranged to engage the engine block to locate the base portion of the engine block in a horizontal (X) plane. The optical head assembly 4 is also positioned in a predetermined fixed relationship to a pair of stops 58 arranged to position the engine block 54 relative to a vertical (Y) plane. The engine block 54 may be moving along a conveyor in the direction illustrated by arrow 60 so as to bring the engine block 54 into engagement with stops 56 and 58. When properly positioned, the axis of optical beam 6 is nominally aligned with the central axis of a plurality of bores 62 machined in the engine block to provide bearing supports to the crankshaft (not illustrated) of the engine. By employing an adaptor of the type illustrated in FIG. 2b, a reflective target 8 may be positioned within any one of the bore holes 62 such as illustrated in FIG. 3. As described above, the reflective target is adapted to provide an optical signal in the form of a return beam containing information regarding the angular position such as pitch and yaw, relative to a pair of axes perpendicular to the central axis of the projected optical beam 6. The pitch and yaw information is read by a photo detector within optical head assembly 4. The reflective target 8 further provides an electrical signal on lead 64 indicative of the lateral position of the central axis of the reflective target 8 relative to the nominal axis defined by optical head assembly 4.

After the alignment of each of the crankshaft bore holes 62 has been tested, the relative position of engine block 54 and optical head assembly 4 is changed so as to cause the axis of the optical beam to coincide with the desired position of the central axis of each of the camshaft bore holes 66. The axis is illustrated in FIG. 3 by line 68. This adjustment may be brought about in a system in which assembly 4 is mounted in the spindle of a boring machine by merely repositioning the boring spindle. When positioned in this manner, an adaptor of smaller size than that used for bore holes 62 is employed in combination with the reflective target 8 so as to position the reflective target in each of the camshaft bore holes 66. Such an adaptor could take the form illustrated in FIG. 2a wherein the outside diameter of sleeve 40 is complementary to the diameter of the camshaft bores 66.

Figure 4:
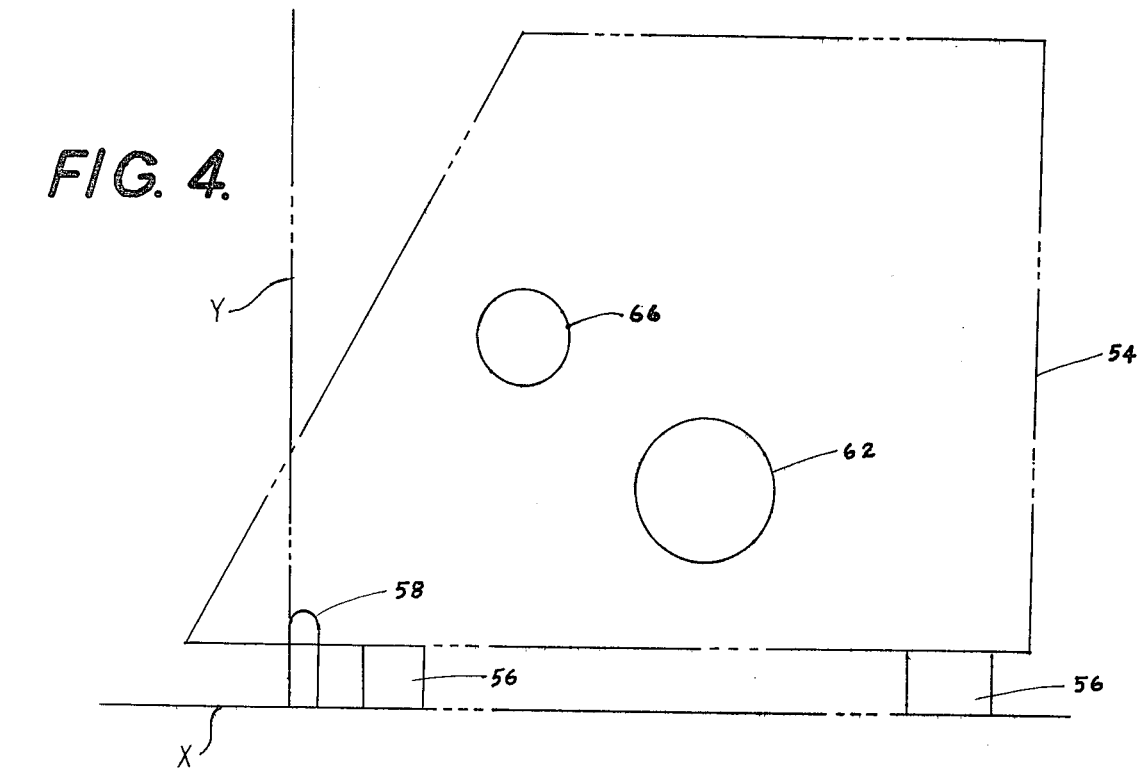
FIG. 4 is an end elevational view of the engine block illustrated in FIG. 3.

FIG. 4 illustrates the relative position of stops 56 and 58 relative to the bore holes 62 and 66 formed in an engine block 54. As is apparent in FIG. 4, stops 56 are designed to position the engine block relative to a horizontal plane "X" while stops 58 are employed to position engine block 54 relative to a vertical plane "Y".

Figure 5:
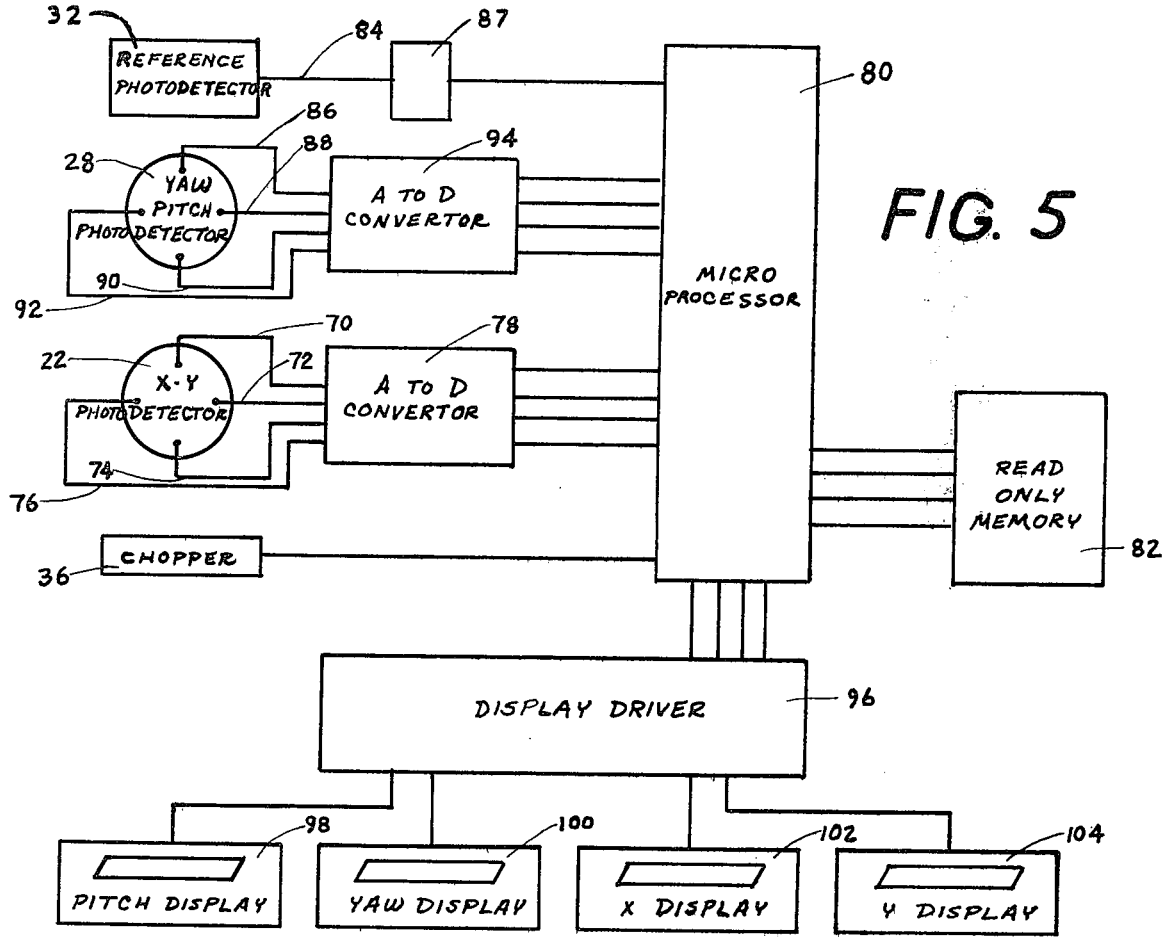
FIG. 5 is a schematic diagram of an electrical circuit for use with the electro-optical alignment system of FIG. 1 whereby both rotational and translational information may be sensed and displayed.

FIG. 5 is a schematic illustration of a circuit which might be employed to provide digital readout of the rotational and translational position of the reflective target relative to a reference position established by an optical head assembly of an electro-optical alignment system of the type illustrated in FIGS. 1 through 4. In particular, photo detector 22 mounted within the reflective target 8 may take the form of a solid state photo detector having four leads connected at points equal distance from the center of the detector and separated equal angularly around the circumference of the detector. The material of which the photo detector is formed has the property of changing its resistance when exposed to illumination within a certain wavelength band. Thus, the relative resistance between respective leads will be a measure of the position at which the center of a light beam impinges on the photo detector surface as measured along two perpendicular axes X and Y. By converting the analog signal received on lines 70 through 76 to a digital form through the use of a conventional A to D converter 78 the relative values may be received and processed by a microprocessor 80 in accordance with a program stored in a conventional read only memory 82. As noted above, a reference photo detector 32 may be employed in the optical head assembly 4 in order to provide a signal on lead 84 through an A to D converter 87 which in turn may be used by the microprocessor to cancel out the effects of ambient light and variation in the intensity of light produced by light source 12. Alternatively, the output from reference photo detector 32 may be used in its analog form in a feedback loop connected to the power source for light source 12 in order to maintain a constant output from the light source. Light chopper 36 may be connected to the microprocessor 80 through line 86 in order to provide a signal by which the microprocessor can synchronize sampling of the output from photo detector 22 and photo detector 28 with the blanking of projected optical beam 6 caused by the optical chopper 36.

The photo detector 28, mounted within the optical head assembly 4, can be of the same type as photo detector 22 including four separate leads 86, 88, 90 and 92 for connecting the photo detector 28 with an A to D converter 94 which in turn is connected to the microprocessor 80 for providing signals thereto regarding the point of impingement of return beam portion 30 relative to the center of the photo detector surface 28. As is apparent from the geometry of the device illustrated in FIG. 1, detector 28 is capable of indicating the angular position of reflective target 8 relative to a first rotational axis perpendicular to the central axis of projected beam 6 and lying within the plane of FIG. 1. Photo detector 28 may also provide a signal indicative of the angular rotation of reflective target 8 relative to an axis perpendicular to the central axis of projected beam 6 and perpendicular to the cross-sectional plane of FIG. 1. Such angular values are conventional termed "pitch" and "yaw".

Microprocessor 80 is programmed by read only memory 82 to process the signals received from detectors 22 and 28 and to send the results in the form of digital signals to a display driver 96. Driver 96 is connected with digital displays 98, 100, 102 and 104 for displaying respectively the pitch and yaw rotational displacement and the X and Y translational displacement of the reflective target 8.

Industrial Application

The above described electro-optical alignment system may be adapted for a variety of applications and is particularly useful for various inspection processes used to verify that certain machining operations performed on articles of manufacture are within acceptable manufacturing tolerances. In addition to the inspection application illustrated in FIG. 3, the apparatus of the subject invention may be employed in a boring machine tool whereby the optical head assembly 4 is mounted within the boring spindle of the machine tool while the reflective target is placed within the bore hole formed in a workpiece. This arrangement allows in situ machine tool audit and correlation. The subject alignment system may also be employed as an in situ engaging system for machine tools. Still other appliations include the use of the alignment system in the servo mechanism of a stabilizing platform or as a salvageable modular gauging system.

I claim:

1. Apparatus for optically determining the translational and rotational orientation of portions of an object with respect to a system reference position, comprising
   (a) a base means for defining a system reference position when mounted on a stable support,
   (b) an optical beam forming means mounted on said base mean for forming and projecting an optical beam along an optical axis having a predetermined relationship with the system reference position, and
   (c) target means for receiving the optical beam when mounted on the object and for redirecting a first portion of said beam to indicate the rotational position of the target means relative to the system reference position and for producing an electrical signal indicative of the translational position of the target means relative to the system reference position.

2. Apparatus as defined in claim 1, wherein said target means includes a translational position sensing means for receiving the optical beam and for producing an electrical signal indicative of the displacement of the optical beam relative to a predetermined reference point defined by said translational position sensing means.

3. Apparatus as defined in claim 2, wherein said target means further includes partially reflective means for reflecting said first portion of the projected optical beam along a reflected beam axis which forms an angle with said optical axis the magnitude of which is indicative of the rotational position of the target means relative to a pair of perpendicular axes and for allowing the remaining portion of said optical beam to project onto said translational position sensing means along the optical axis said translational position sensing means includes a photo detector means.

4. Apparatus as defined in claim 3, wherein said partially reflective means includes a partially silvered mirror positioned in front of said photodetector means along the optical axis and within a plane normal to the optical axis.

5. Apparatus as defined in claim 3, wherein said optical beam forming means includes a rotational position sensing means for receiving said first portion of the projected optical beam and for producing an electrical signal therefrom indicative of the rotational position of the target means relative to said pair of perpendicular axes.

6. Apparatus as defined in claim 5, wherein said optical beam forming means includes a beam splitter means positioned within the optical beam for allowing the optical beam to be projected along the optical axis and for reflecting said first portion of the optical beam received along said reflected beam axis onto said rotational position sensing means, said beam splitter means and said rotational position sensing means being fixedly mounted on said base means.

7. Apparatus as defined in claim 6, wherein said optical beam forming means includes optical chopper means mounted on said base means for blanking the optical beam at a predetermined frequency and further including discriminating circuitry connected with said rotational and translational position sensing means for improving the noise to signal ratio of the signals received from said rotational and translational position sensing means by synchronizing the processing of the signals with the frequency of blanking of said optical chopper means.

8. Apparatus as defined in claim 7, wherein said optical beam forming means includes a laser.

9. Apparatus as defined in claim 4, wherein said target means includes means for eliminating unwanted reflections, said means including a plane glass mounted in front of said partially reflective means at an acute angle with respect to a plane normal to the optical axis.

10. Apparatus as defined in claim 7, wherein said optical beam forming means includes a reference position sensing means for receiving a reference portion of the optical beam and for generating an electrical reference signal indicative of the presence of the reference portion of the optical beam, said beam splitter means including a reference forming means for forming said reference portion of the optical beam.

11. Apparatus as defined in claim 9 for use in determining the alignment of different sized target receiving circular bores formed in an object, wherein said target means includes a target housing having an outside diameter less than the diameter of the smallest circular bore and having a predetermined target axis, said target means including a plurality of adaptor sleeves, each said adaptor sleeve including means for mounting said target housing within said sleeve and an outside surface configured to be positioned within a circular bore having a complementary configuration such that the target axis is fixed in a predetermined relationship with respect to the axis of the bore in which the adaptor sleeve is placed.

12. A method for measuring the rotational and translational alignment of a portion of an object relative to a remote reference position, comprising the steps of
   (a) forming an optical beam at the reference position;
   (b) projecting the reference beam along an optical axis extending from the reference position toward the object;
   (c) returning a first portion of the optical beam received by the object along a reflected beam axis which forms an angle with the optical axis which is indicative of the rotational position of the portion of the object relative to a pair of perpendicular axes;
   (d) sensing the position of the remaining portion of the optical beam at the location of the object and producing an electrical signal from the remaining portion of the optical beam indicative of the translational position of the object relative to the reference position; and
   (e) sensing the first portion of the optical beam returned from the object and producing an electrical signal indicative of the rotational position of the portion of the movable object relative to the reference position.

* * * * *